United States Patent
Kato et al.

(10) Patent No.: US 8,298,111 B2
(45) Date of Patent: Oct. 30, 2012

(54) AUTOMATIC TRANSMISSION

(75) Inventors: Hiroshi Kato, Kariya (JP); Masaaki Nishida, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 870 days.

(21) Appl. No.: 12/216,425

(22) Filed: Jul. 3, 2008

(65) Prior Publication Data

US 2009/0011893 A1 Jan. 8, 2009

(30) Foreign Application Priority Data

Jul. 3, 2007 (JP) .................................. 2007-175034

(51) Int. Cl.
*F16H 3/44* (2006.01)

(52) U.S. Cl. ........................................ 475/280; 475/288

(58) Field of Classification Search ........... 475/275–291
See application file for complete search history.

(56) References Cited

U.S. PATENT DOCUMENTS

| | | | | |
|---|---|---|---|---|
| 7,833,124 | B2 * | 11/2010 | Choi | 475/286 |
| 7,931,558 | B2 * | 4/2011 | Kato et al. | 475/275 |
| 2002/0142880 | A1 * | 10/2002 | Hayabuchi et al. | 475/275 |
| 2008/0202884 | A1 * | 8/2008 | Nishida et al. | 192/106 F |
| 2008/0207384 | A1 * | 8/2008 | Nishida et al. | 475/276 |
| 2009/0264237 | A1 * | 10/2009 | Taniguchi et al. | 475/116 |
| 2010/0048346 | A1 * | 2/2010 | Hoffman et al. | 475/284 |

FOREIGN PATENT DOCUMENTS

| | | |
|---|---|---|
| JP | A 2005-061436 | 3/2005 |
| JP | A 2005-98432 | 4/2005 |
| JP | A 2005-180564 | 7/2005 |
| JP | A 2006-194435 | 7/2006 |

OTHER PUBLICATIONS

Apr. 17, 2012 Office Action issued in Japanese Patent Application No. 2007-175034 (English Translation only).

* cited by examiner

*Primary Examiner* — Roger Pang
(74) *Attorney, Agent, or Firm* — Oliff & Berridge, PLC

(57) ABSTRACT

An automatic transmission includes an input shaft, an acceleration/deceleration output unit that is coupled to the input shaft and has a first element that selectively outputs a decelerated rotation or an accelerated rotation of the input shaft and a second element that outputs a same number of rotations as the input shaft, a multiple planetary gear set for shifting having third, fourth, fifth and sixth elements, a first clutch coupling the first element and the sixth element selectively, a second clutch coupling the input shaft and the fourth element selectively, a third clutch coupling the first element and the third element selectively, a fourth clutch coupling the second element and the third element selectively, a first brake fixing the third element selectively, a second brake fixing the fourth element selectively and an output shaft coupled directly to the fifth element.

4 Claims, 4 Drawing Sheets

FIG. 2

| | C-1 | C-2 | C-3 | C-4 | B-1 | B-2 | B-3 | B-4 | F-1 | GEAR RATIO | STEP |
|---|---|---|---|---|---|---|---|---|---|---|---|
| 1st | ● | – | – | – | – | ▲ | – | ● | ● | 4.848 | 2.075 |
| 2nd | ● | – | – | – | ● | – | – | ● | – | 2.336 | 1.285 |
| 3rd | ● | – | ● | – | – | – | – | ● | – | 1.818 | 1.181 |
| 4th | ● | – | – | ● | – | – | – | ● | – | 1.539 | 1.279 |
| 5th | ● | ● | – | – | – | – | – | ● | – | 1.203 | 1.203 |
| 6th | – | ● | – | ● | – | – | – | (●) | – | 1.000 | 1.093 |
| 7th | – | ● | ● | – | – | – | – | ● | – | 0.915 | 1.104 |
| 8th-1 | – | ● | – | – | ● | – | – | (●) | – | 0.829 | |
| 8th-2 | – | ● | – | – | ● | – | (●) | – | – | 0.829 | 1.109 |
| 9th | ● | – | – | – | – | – | ● | – | – | 0.748 | 1.106 |
| 10th | ● | – | – | ● | ● | – | ● | – | – | 0.676 | 1.150 |
| 11th | ● | – | ● | – | – | – | ● | – | – | 0.588 | 1.117 |
| 12th | ● | – | ● | – | – | – | ● | – | – | 0.526 | |
| REV1 | – | – | ● | – | – | ● | – | ● | – | 5.510 | |
| REV2 | – | – | ● | ● | – | ● | – | – | – | 3.030 | |
| REV3 | – | – | ● | – | – | ● | ● | – | – | 1.595 | |

TOTAL SPREAD 9.21

$\lambda 0 = 0.5 \quad \lambda 1 = 0.45$
$\lambda 2 = 0.55 \quad \lambda 3 = 0.375$ STATE OF ENGAGEMENT
● : ENGAGED
(●) : ENGAGED BUT TRANSFERRING NO TORQUE
▲ : ENGAGED WHEN ENGINE BRAKING

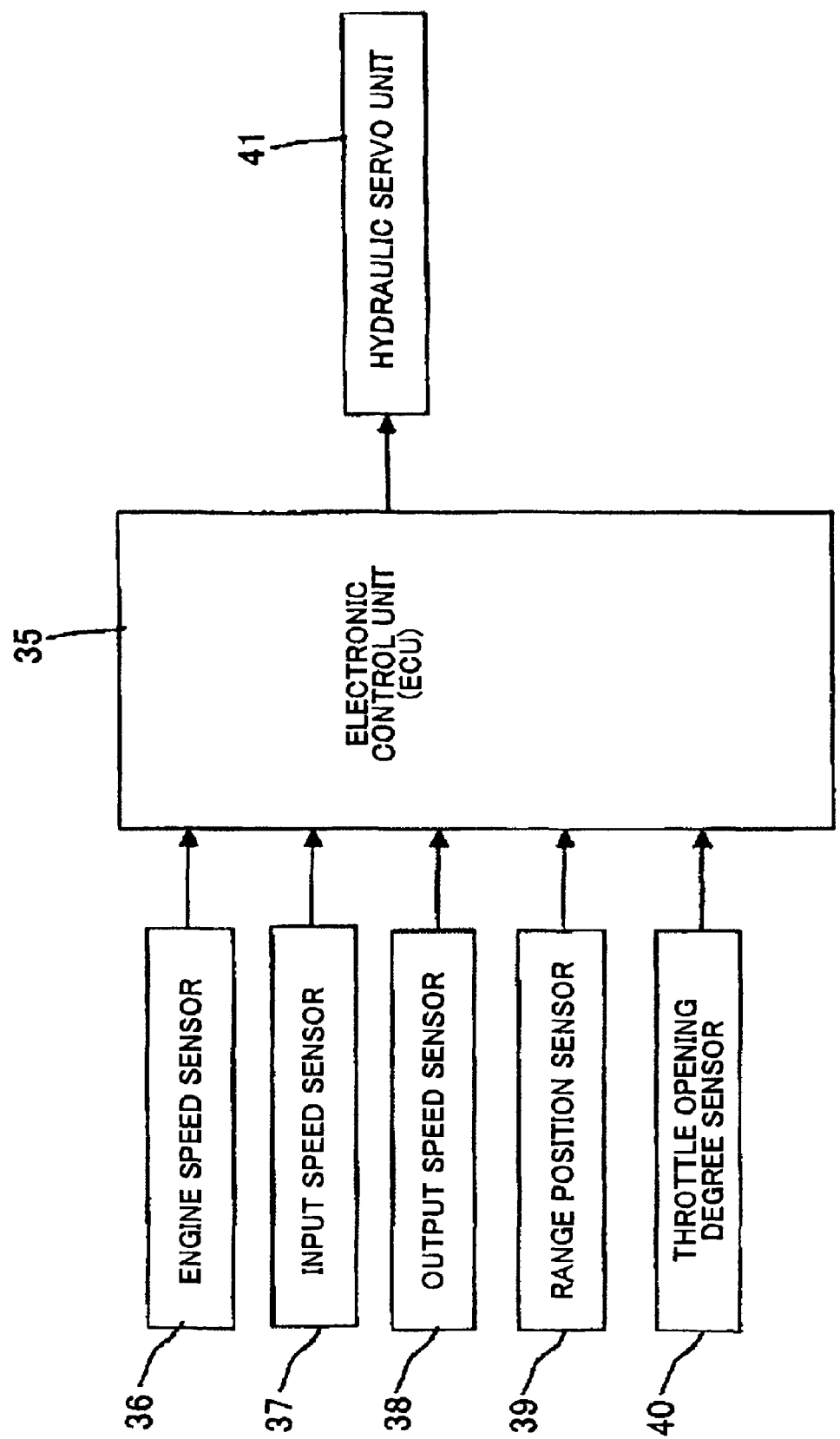

__US 8,298,111 B2__

AUTOMATIC TRANSMISSION

INCORPORATION BY REFERENCE

The disclosure of Japanese Patent Application No. 2007-175034 filed on Jul. 3, 2007 including the specification, drawings and abstract is incorporated herein by reference in its entirety.

BACKGROUND

The present invention relates to an automatic transmission.

Japanese Patent Application Publication No. JP-A-2005-61436 (pp. 12 and 13, FIG. 1), discloses an automatic transmission which has an input shaft, a multiple planetary gear set for acceleration/deceleration, a multiple planetary gear set for shifting, an output shaft, first to fifth clutches, and first and second brakes. The automatic transmission shifts a rotation of the input shaft with twelve forward speeds and three reverse speeds to transfer the rotation to the output shaft.

The multiple planetary gear set for acceleration/deceleration is structured having a common carrier rotatably supporting a small-diameter pinion and a large-diameter pinion which are formed integrally on the same axis, a first sun gear meshing with the small-diameter pinion, a second sun gear meshing with the large-diameter pinion, and a common ring gear meshing with the large-diameter pinion. The multiple planetary gear set for shifting is structured having a common carrier rotatably supporting a long pinion and a pinion that mesh with each other, a third sun gear meshing with the long pinion, a fourth sun gear meshing with the pinion, and a common ring gear meshing with the long pinion.

The second sun gear of the multiple planetary gear set for acceleration/deceleration is fixed, and the common carrier is coupled directly to the input shaft. The third sun gear of the multiple planetary gear set for shifting can be coupled to the first sun gear of the multiple planetary gear set for acceleration/deceleration via the third and fifth clutches, and can be fixed via the first brake. The fourth sun gear can be coupled to the first sun gear of the multiple planetary gear set for acceleration/deceleration via the first and fifth clutches, and can be coupled to the common ring gear via the first and fourth clutches. The common carrier of the multiple planetary gear set for shifting can be coupled to the input shaft via the second clutch, and can be fixed via the second brake. The common ring gear of the multiple planetary gear set for shifting is coupled directly to the output shaft.

SUMMARY

In recent years, to improve fuel consumption and power transferring performance, or to obtain gear ratios that match a driver's tastes, there are demands for increasing shift speeds of automatic transmissions. The automatic transmission disclosed in Japanese Patent Application Publication No. JP-A-2005-61436 intends to meet such demands, and can obtain gear ratios of twelve forward speeds and three reverse speeds. However, in the automatic transmission disclosed in Japanese Patent Application Publication No. JP-A-2005-61436, when shifting to an adjacent shift speed, two elements out of the plural clutches and brakes must switch from engaged states to disengaged states, and two other elements must switch from disengaged states to engaged states simultaneously. Thus, the transmission control becomes complicated, and a shock can be generated when timing of switching is shifted.

The present invention is made to satisfy such demands, and an object thereof is to provide an automatic transmission which has a simple structure and can achieve appropriately separated twelve forward speeds and three reverse speeds by simple shift control, just by switching one element out of plural clutches and brakes from an engaged state to a disengaged state and another element from a disengaged state to an engaged state simultaneously. The present invention can also achieve various other advantages.

According to an exemplary aspect of the present invention, an automatic transmission includes an input shaft; an acceleration/deceleration output unit that is coupled to the input shaft and has a first element that selectively outputs a decelerated rotation or an accelerated rotation of the input shaft and a second element that outputs a same number of rotations as the input shaft; a multiple planetary gear set for shifting having third, fourth, fifth and sixth elements; a first clutch coupling the first element and the sixth element selectively; a second clutch coupling the input shaft and the fourth element selectively; a third clutch coupling the first element and the third element selectively; a fourth clutch coupling the second element and the third element selectively; a first brake fixing the third element selectively; a second brake fixing the fourth element selectively; and an output shaft coupled directly to the fifth element.

BRIEF DESCRIPTION OF THE DRAWINGS

Various exemplary aspects of the invention will be described with reference to the drawings, wherein:

FIG. 2 shows an operation table of brakes and clutches with respective shift speeds;

FIG. 4 is a block diagram showing a control unit.

DETAILED DESCRIPTION OF EMBODIMENTS

Figure 1:
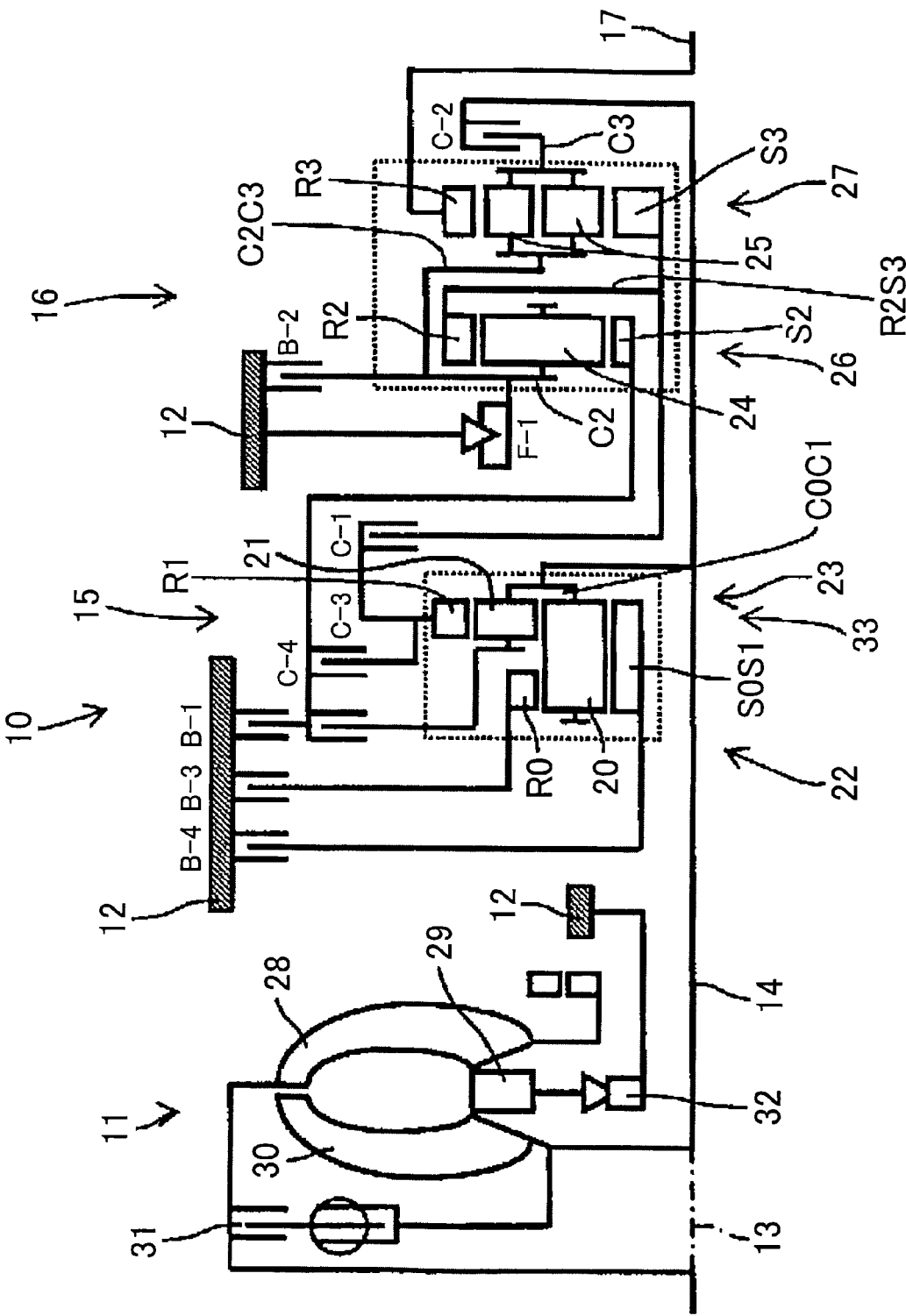
FIG. 1 is a skeleton diagram showing an embodiment of an automatic transmission according to the present invention.

Hereinafter, an automatic transmission according to a first embodiment of the present invention will be explained based on the drawings. An automatic transmission 10 shown in FIG. 1 is used for shifting the output rotation of a hydraulic torque converter 11 rotary driven by an engine of an automobile, for example, and transferring the rotation to driving wheels. The automatic transmission 10 is structured having an input shaft 14, a multiple planetary gear set for acceleration/deceleration 15 as an acceleration/deceleration output unit, a multiple planetary gear set for shifting 16, an output shaft 17, first, second, third and fourth clutches C-1, C-2, C-3, C-4, first, second, third, fourth brakes B-1, B-2, B-3, B-4 and a one way clutch F-1, and so on, which are supported on a common axis 13 sequentially inside a transmission case 12 assembled with a vehicle body.

The multiple planetary gear set for acceleration/deceleration 15 is structured having a common carrier C0C1 rotatably supporting a long pinion 20 and a pinion 21 which mesh with each other, a common sun gear S0S1 meshing with the long pinion 20, a first ring gear R0 meshing with the long pinion 20, and a second ring gear R1 meshing with the pinion 21.

The multiple planetary gear set for shifting 16 has a single pinion planetary gear 26 and a double pinion planetary gear 27, where a third carrier C2 supporting a pinion 24 of the single pinion planetary gear 26 and a fourth carrier C3 supporting pinions 25, 25, which mesh with each other, of the double pinion planetary gear 27 are coupled directly, and a third ring gear R2 of the single pinion planetary gear 26 and a fourth sun gear S3 of the double pinion planetary gear 27 are coupled directly.

In the multiple planetary gear set for acceleration/deceleration 15, the common sun gear S0S1 can be fixed via the fourth brake B-4, and the first ring gear R0 can be fixed via the third brake B-3. The common carrier C0C1 is coupled directly to the input shaft 14.

A third sun gear S2 of the multiple planetary gear set for shifting 16 can be coupled to the common carrier C0C1 of the multiple planetary gear set for acceleration/deceleration 15 via the fourth clutch C-4, can be coupled to the second ring gear R1 via the third clutch C-3, and can be fixed via the first brake B-1. The third ring gear R2 and the fourth sun gear S3 coupled directly to each other can be coupled to the second ring gear R1 via the first clutch C-1. The third, fourth carriers C2C3 coupled directly to each other can be coupled to the input shaft 14 via the second clutch C-2, can be fixed via the second brake B-2, and are coupled to a case 12 via the one way clutch F-1 arranged in parallel to the second brake B-2 to be prevented from rotating in reverse. The fourth ring gear R3 is coupled directly to the output shaft 17.

In addition, a pump impeller 28 of the hydraulic torque converter 11 is rotary driven by the not-shown engine to send out oil, and a stator 29 supported via a one way clutch 32 on the case 12 receives reaction force of the oil to generate torque in the turbine 30. The input shaft 14 is coupled directly to a turbine 30. Numeral 31 denotes a lock-up clutch that enables coupling of the pump impeller 28 and the turbine 30.

The automatic transmission 10 structured as above can realize shift speeds of twelve forward speeds and three reverse speeds by selectively engaging the first to fourth clutches C-1 to C-4, selectively engaging the first to fourth brakes B-1 to B-4, and selectively coupling or fixing respective elements of the input shaft 14, the output shaft 17, the multiple planetary gear set for acceleration/deceleration 15 and the multiple planetary gear set for shifting 16. In the operation table of FIG. 2, any ● added to the fields corresponding to the respective shift speeds of the first to fourth clutches C-1 to C-4, the first to fourth brakes B-1 to B-4 and the one way clutch F-1 indicates an engaged and coupled state in the case of a clutch, or an engaged and fixed state in the case of a brake. Any (●) added indicates a state where an oil pressure is supplied to a hydraulic servo in preparation for shifting so that the shifting is performed smoothly, but a function to transfer the driving force is not carried out. Any ▲ added in FIG. 2 indicates a state where the brake is engaged when engine braking is applied.

In a single pinion planetary gear 22 structured having the common sun gear S0S1, the common carrier C0C1 supporting the long pinion 20 and the pinion 21, and the first ring gear R0 meshing with a first sun gear S0 via the long pinion 20 of the multiple planetary gear set for acceleration/deceleration 15, and in the single pinion planetary gear 27 of the multiple planetary gear set for shifting 16, a relationship of the speed Ns of the sun gear, the speed Nc of the carrier, the speed Nr of the ring gear with the gear ratio $\lambda$ of the single pinion planetary gear is represented by Equation (1).

In a double pinion planetary gear 23 structured having the common sun gear S0S1, the common carrier C0C1 supporting the long pinion 20 and the pinion 21, and the second ring gear R1 meshing with the common sun gear S0S1 via the long pinion 20 and the pinion 21 of the multiple planetary gear set for acceleration/deceleration 15, and in the double pinion planetary gear 27 of the multiple planetary gear set for shifting 16, a relationship of the speed Ns of the sun gear, the speed Nc of the carrier, the speed Nr of the ring gear with the gear ratio $\lambda$ of the double pinion planetary gear is represented by Equation (2), and the gear ratio for each shift speed of the automatic transmission 10 is calculated based on Equations (1), (2).

When the number of teeth of the sun gears S0, S2 of the single pinion planetary gears 22, 26 are Zs0, Zs2, the number of teeth of the ring gears R0, R2 are Zr0, Zr2, the number of teeth of the sun gears S1, S3 of the double pinion planetary gears 23, 27 are Zs1, Zs3, and the number of teeth of the ring gears R1, R3 are Zr1, Zr3, gear ratios of the single pinion planetary gears 22, 26, and the double pinion planetary gears 23, 27 are $\lambda 0=Zs0/Zr0$, $\lambda 2=Zs2/Zr2$, $\lambda 1=Zs1/Zr1$, $\lambda 3=Zs3/Zr3$, respectively.

$$Nr=(1+\lambda)Nc-\lambda Ns \quad (1)$$

$$Nr=(1-\lambda)Nc+\lambda Ns \quad (2)$$

Figure 3:
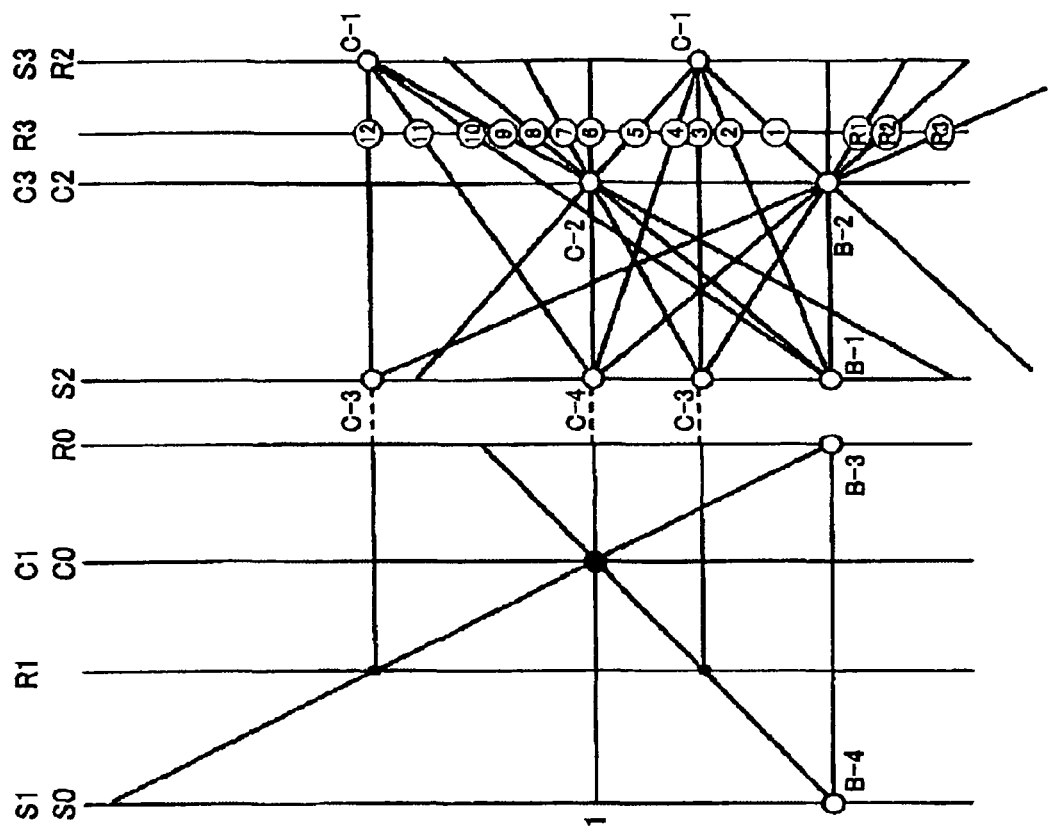
FIG. 3 is a speed diagram showing rotation ratios of respective elements of planetary gears with respective shift speeds.

When the first to fourth clutches C-1 to C-4 are engaged selectively, and the first to fourth brakes B-1 to B-4 are engaged selectively, the speed ratios of the respective elements of the multiple planetary gear sets for acceleration/deceleration and for shifting 15, 16 are as represented by speed diagrams shown in FIG. 3. In the speed diagrams, respective elements comprising the sun gears, the carriers, and the ring gears of the planetary gears are arranged in the horizontal axis direction at intervals corresponding to the gear ratios, and the speed ratios thereof are taken on the vertical axis direction corresponding to the respective elements. In FIG. 3, speed diagrams of the multiple planetary gear sets for acceleration/deceleration and for shifting 15, 16 are arranged left to right. For the multiple planetary gear set for acceleration/deceleration 15, speed ratios of the common sun gear S0S1, the second ring gear R1, the common carrier C0C1 and the first ring gear R0 are represented on respective vertical lines to which S0S1, R1, C0C1, R0 are added respectively. For the multiple planetary gear set for shifting 16, speed ratios of the third sun gear S2, the third, fourth carriers C2C3 coupled to each other directly, the fourth ring gear R3, and the third ring gear and the fourth sun gear R2S3 coupled to each other directly are represented on respective vertical lines to which S2, C2C3, R3, R2S3 are added respectively.

For the single pinion planetary gear 22 of the multiple planetary gear set for acceleration/deceleration 15, an interval between the vertical line of the common sun gear S0S1 and the vertical line of the common carrier C0C1 is assumed as 1, and the vertical line of the first ring R0 is arranged separated from the vertical line of the common carrier C0C1 by the gear ratio $\lambda 0$ on the opposite side of the vertical line of the common sun gear S0S1. For the deceleration double pinion planetary gear 23, an interval between the vertical line of the common sun gear S0S1 and the vertical line of the common carrier C0C1 is assumed as 1, and the vertical line of the second ring gear R1 is arranged separated from the vertical line of the common carrier C0C1 by the gear ratio $\lambda 1$ on the same side as the vertical line of the common sun gear S0S1.

In the multiple planetary gear set for acceleration/deceleration 15, the common sun gear S0S1, the second ring gear R1, the common carrier C0C1, and the first ring gear R0 as four elements arranged sequentially at intervals corresponding to the gear ratios on the speed diagrams for first, second, third and fourth elements respectively in order of the arrangement. For a better understanding of the claims only, the second ring gear R1 and the common carrier C0C1 are respective examples of the first element and the second element.

As is clear from the speed diagrams, when the fourth and third brakes B-4, B-3 are engaged selectively, the multiple planetary gear set for acceleration/deceleration 15 decelerates or accelerates and outputs the rotation of the input shaft 14 from the second ring gear R1 as the second element, and outputs the same number of rotations as the input shaft 14 from the third, fourth carriers C0C1 as the third element coupled directly to each other. Thus, the multiple planetary gear set for acceleration/deceleration 15 forms an acceleration/deceleration output unit 33 having the second element, which is coupled to the input shaft 14 and decelerates or accelerates and outputs the rotation of the input shaft 14, and the third element rotating at the same number of rotations as the input shaft 14.

For the single pinion planetary gear 26 of the multiple planetary gear set for shifting 16, an interval between the vertical line of the third sun gear S2 and the vertical line of the third, fourth carriers C2C3 is assumed as 1, and the vertical line of the third ring gear and the fourth sun gear R2S3 are arranged separated from the vertical line of the third, fourth carriers C2C3 by the gear ratio λ2 on the opposite side of the vertical line of the third sun gear S2. For the double pinion planetary gear 27, an interval between the vertical line of the fourth sun gear S3 and the vertical line of the third, fourth carriers C2C3 is assumed as 1, and the vertical line of the fourth ring gear R3 is arranged separated from the vertical line of the third, fourth carriers C2C3 by the gear ratio λ3 on the same side as the vertical line of the third ring gear and the fourth sun gear R2S3.

In the multiple planetary gear set for shifting 16, the third sun gear S2, the third, fourth carriers C2C3 coupled to each other directly, the fourth ring gear R3, and the third ring gear and the fourth sun gear R2S3 coupled to each other directly, which are four elements arranged sequentially at intervals corresponding to the gear ratios on the speed diagrams, form fifth, sixth, seventh and eighth elements respectively in order of the arrangement. For a better understanding of the claims only, the third sun gear S2, the third, fourth carriers C2C3, the fourth ring gear R3 and the third ring gear and the fourth sun gear R2S3 are respective examples of third, fourth, fifth and sixth elements.

On the speed diagrams, C-1 to C-4, B-1 to B-4, F-1 are written at the points where the first to fourth clutches C-1 to C-4, the first to fourth brakes B-1 to B-4 and the one way clutch F-1 are operated selectively.

A control unit for the automatic transmission 10 will be explained based on the block diagram shown in FIG. 4. A control unit 35 including a CPU, to which respective detection signals are inputted from an engine speed sensor 36 detecting the speed Ne on the engine side of the torque converter 11 to which the rotation of the engine is transferred, an input speed sensor 37 detecting the speed N1 of the input shaft 14, an output speed sensor 38 detecting the speed Nv of the output shaft 17, a range position sensor 39 transmitting detection signals D, N, R when the shift lever is shifted to a drive range D, a neutral range N, a reverse range R, a throttle opening degree sensor 40 detecting the amount Ss of pressing down the accelerator, and/or the like, selects an optimum shift speed based on these detection signals, and outputs a control current to respective hydraulic servo units 41 which operate the respective clutches and brakes, so as to selectively engage the first to fourth clutches C-1 to C-4, the first to fourth brakes B-1 to B-4 as shown in the operation table of FIG. 2, thereby achieving the twelve forward speeds and three reverse speeds.

The first (1st) speed is achieved by engagement of the first clutch C-1 and the fourth brake B-4 by the control unit 35 and automatic engagement of the one way clutch F-1. The rotation of the input shaft 14 is transferred directly to the common carrier C0C1 of the multiple planetary gear set for acceleration/deceleration 15, and the common sun gear S0S1 is fixed via the fourth brake B-4, thereby rotating the second ring gear R1 at a decelerated speed. The rotation of the second ring gear R1 is inputted to the third ring gear and the fourth sun gear R2S3 of the multiple planetary gear set for shifting 16 coupled directly to each other via the first clutch C-1, and the third, fourth carriers C2C3 coupled directly to each other are blocked so as to not rotate in reverse by the one way clutch F-1 and receive a reaction force. Thus, the fourth ring gear R3 and further the output shaft 17 are rotated in a forward direction by decelerating the rotation of the input shaft 14 with the gear ratio of the first speed.

When engine braking is applied on a downhill road, the speed transferred from the driving wheels to the third, fourth carriers C2C3 via the fourth ring gear R3 becomes larger than the speed transferred from the engine side, and the direction of the reaction force operating on the third, fourth carriers C2C3 is inverted. Accordingly, when applying engine braking, as shown by ▲ in FIG. 2, the third, fourth carriers C2C3 are fixed by engagement of the second brake B-2.

The second speed (2nd) is achieved by engagement of the first clutch C-1 and the first, fourth brakes B-1, B-4. The rotation of the input shaft 14 is transferred directly to the common carrier C0C1, and the common sun gear S0S1 is fixed via the fourth brake B-4, thereby rotating the second ring gear R1 at a decelerated speed. The rotation of the second ring gear R1 is inputted to the third ring gear and the fourth sun gear R2S3 of the multiple planetary gear set for shifting 16 via the first clutch C-1, and the fourth sun gear S3 is fixed via the first brake B-1. Thus, the fourth ring gear R3 and further the output shaft 17 are rotated in a forward direction by decelerating the rotation of the input shaft 14 with the gear ratio of the second speed.

The third speed (3rd) is achieved by engagement of the first, third clutches C-1, C-3 and the fourth brake B-4. The rotation of the input shaft 14 is transferred directly to the common carrier C0C1, and the common sun gear S0S1 is fixed via the fourth brake B-4, thereby rotating the second ring gear R1 at a decelerated speed. The rotation of the second ring gear R1 is inputted to the third ring gear and the fourth sun gear R2S3 and the third sun gear S2 of the multiple planetary gear set for shifting 16 which are coupled to each other directly via the first, third clutches C-1, C-3. Thus, the fourth ring gear R3 and further the output shaft 17 are rotated in a forward direction by decelerating the rotation of the input shaft 14 with the gear ratio of the third speed.

The fourth speed (4th) is achieved by engagement of the first, fourth clutches C-1, C-4 and the fourth brake B-4. The rotation of the input shaft 14 is transferred directly to the common carrier C0C1, and the common sun gear S0S1 is fixed via the fourth brake B-4, thereby rotating the second ring gear R1 at a decelerated speed. The rotation of the second ring gear R1 is transferred to the third ring gear and the fourth sun gear R2S3 of the multiple planetary gear set for shifting 16 via the first clutch C-1, and the rotation of the common carrier C0C1 is transferred to the third sun gear S2 via the fourth clutch C-4. Thus, the fourth ring gear R3 and further the output shaft 17 are rotated in a forward direction by decelerating the rotation of the input shaft 14 with the gear ratio of the fourth speed.

The fifth speed (5th) is achieved by engagement of the first, second clutches C-1, C-2 and the fourth brake B-4. The rotation of the input shaft 14 is transferred directly to the common carrier C0C1, and the common sun gear S0S1 is fixed via the fourth brake B-4, thereby rotating the second ring gear R1 at a decelerated speed. The rotation of the second ring gear R1 is transferred to the third ring gear and the fourth sun gear R2S3 of the multiple planetary gear set for shifting 16 via the first clutch C-1, and the rotation of the input shaft 14 is transferred to the third, fourth carriers C2C3 via the second clutch C-2. Thus, the fourth ring gear R3 and further the output shaft 17 are rotated in a forward direction by decelerating the rotation of the input shaft 14 with the gear ratio of the fifth speed.

The sixth speed (6th) is achieved by engagement of the second, fourth clutches C-2, C-4 and the fourth brake B-4. The rotation of the common carrier C0C1 coupled directly to the input shaft 14 of the multiple planetary gear set for acceleration/deceleration 15 is transferred to the third sun gear S2 of the multiple planetary gear set for shifting 16 via the fourth clutch C-4, and the rotation of the input shaft 14 is transferred to the third, fourth carriers C2C3 via the second clutch C-2. Thus, the fourth ring gear R3 and further the output shaft 17 are rotated in a forward direction at the same number of rotations as the input shaft 14. In this case, the fourth brake B-4 supplies an oil pressure to the hydraulic servo to fix the common sun gear S0S1, but is not carrying out the function to transfer the driving force.

The seventh speed (7th) is achieved by engagement of the second, third clutches C-2, C-3 and the fourth brake B-4. The rotation of the input shaft 14 is transferred directly to the common carrier C0C1, and the common sun gear S0S1 is fixed via the fourth brake B-4, thereby rotating the second ring gear R1 at a decelerated speed. The rotation of the second ring gear R1 is transferred to the third sun gear S2 of the multiple planetary gear set for shifting 16 via the third clutch C-3, and the rotation of the input shaft 14 is transferred to the third, fourth carriers C2C3 via the second clutch C-2. Thus, the fourth ring gear R3 and further the output shaft 17 are rotated in a forward direction by accelerating the rotation of the input shaft 14 with the gear ratio of the seventh speed.

There are two types of eighth speeds, one being achieved by engagement of the second clutch C-2 and the first brake B-1 and the fourth brake B-4 (eighth speed-1) and one being achieved by engagement of the second clutch C-2 and the first brake B-1 and the third brake B-3 (eighth speed-2). However, although an oil pressure is supplied to the hydraulic servo, the third brake B-3 and the fourth brake B-4 are both not carrying out the function to transfer the driving force. Specifically, the third sun gear S2 of the multiple planetary gear set for shifting 16 is fixed via the first brake B-1, and the rotation of the input shaft 14 is transferred to the third, fourth carriers C2C3 via the second clutch. Thus, the fourth ring gear R3 and further the output shaft 17 are rotated in a forward direction by accelerating the rotation of the input shaft 14 with the gear ratio of the eighth speed. Here, the reason why the two types of eighth speed-1 and eighth speed-2 are set is to prevent shifting due to holding and changing of three friction elements between the seventh speed and the eighth speed, and between the eighth speed and the ninth speed. Specifically, the eighth speed-1 is a shift speed achieved by engaging the fourth brake B-4 just after up-shifting from the seventh speed to the eighth speed (just after completing release of the third clutch C-3 and engagement of the first brake B-1) or just before down-shifting from the eighth speed to the seventh speed (just before starting engagement of the third clutch C-3 and release of the first brake B-1). The eighth speed-2 is set as a shift speed achieved by engaging the third brake B-3 just before up-shifting from the eighth speed to the ninth speed (just before starting release of the first brake B-1 and engagement of the first clutch C-1) or just after down-shifting from the ninth speed to the eighth speed (just after completing release of the first clutch C-1 and engagement of the first brake B-1), thereby preventing holding and changing shifting of three friction elements between the seventh speed and the eighth speed, and between the eighth speed and the ninth speed.

The ninth speed is achieved by engagement of the first, second clutches C-1, C-2 and the third brake B-3. The rotation of the input shaft 14 is transferred directly to the common carrier C0C1 of the multiple planetary gear set for acceleration/deceleration 15, and the first ring gear R0 is fixed via the third brake B-3, thereby rotating the second ring gear R1 at an accelerated speed. The rotation of the second ring gear R1 is transferred via the first clutch C-1 to the third ring gear, fourth sun gear R2S3 of the multiple planetary gear set for shifting 16 which are coupled directly, and the rotation of the input shaft 14 is transferred to the third, fourth carriers C2C3 via the second clutch. Thus, the fourth ring gear R3 and further the output shaft 17 are rotated in a forward direction by accelerating the rotation of the input shaft 14 with the gear ratio of the ninth speed.

The tenth speed is achieved by engagement of the first clutch C-1 and the first, third brakes B-1, B-3. The rotation of the input shaft 14 is transferred directly to the common carrier C0C1, and the first ring gear R0 is fixed via the third brake B-3, thereby rotating the second ring gear R1 at an accelerated speed. The rotation of the second ring gear R1 is transferred via the first clutch C-1 to the third ring gear, the fourth sun gear R2S3 of the multiple planetary gear set for shifting 16 which are coupled directly, and the third sun gear S2 is fixed via the first brake B-1. Thus, the fourth ring gear R3 and further the output shaft 17 are rotated in a forward direction by accelerating the rotation of the input shaft 14 with the gear ratio of the tenth speed. In this case, the third brake B-3 supplies an oil pressure to the hydraulic servo to fix the first ring gear R0, but is not carrying out the function to transfer the driving force.

The eleventh speed is achieved by engagement of the first, fourth clutches C-1, C-4 and the third brake B-3. The rotation of the input shaft 14 is transferred directly to the common carrier C0C1, and the first ring gear R0 is fixed via the third brake B-3, thereby rotating the second ring gear R1 at an accelerated speed. The rotation of the second ring gear R1 is transferred via the first clutch C-1 to the third ring gear, and the fourth sun gear R2S3 of the multiple planetary gear set for shifting 16 which are coupled directly, and the rotation of the common carrier C0C1 coupled directly to the input shaft 14 is transferred to the third sun gear S2 via the fourth clutch C-4. Thus, the fourth ring gear R3 and further the output shaft 17 are rotated in a forward direction by accelerating the rotation of the input shaft 14 with the gear ratio of the eleventh speed.

The twelfth speed is achieved by engagement of the first, third clutches C-1, C-3 and the third brake B-3. The rotation of the input shaft 14 is transferred directly to the common carrier C0C1, and the first ring gear R0 is fixed via the third brake B-3, thereby rotating the second ring gear R1 at an accelerated speed. The rotation of the second ring gear R1 is transferred via the first, third clutched C-1, C-3 to the third ring gear, and the fourth sun gear R2S3 and the third sun gear S2 of the multiple planetary gear set for shifting 16 which are coupled directly. Thus, the fourth ring gear R3 and further the output shaft 17 are rotated in a forward direction by accelerating the rotation of the input shaft 14 with the gear ratio of the twelfth speed.

The first reverse speed (Rev1) is achieved by engagement of the third clutch C-3 and the second, fourth brakes B-2, B-4. The rotation of the input shaft 14 is transferred directly to the common carrier C0C1, and the common sun gear S0S1 is fixed via the fourth brake B-4, thereby rotating the second ring gear R1 at a decelerated speed. The rotation of the second ring gear R1 is transferred to the third sun gear S2 of the multiple planetary gear set for shifting 16 via the third clutch C-3, and the third, fourth carriers C2C3 are fixed via the second brake B-2. Thus, the fourth ring gear R3 and further the output shaft 17 are rotated in a reverse direction by decelerating the rotation of the input shaft 14 with the gear ratio of the first reverse speed.

The second reverse speed (Rev2) is achieved by engagement of the fourth clutch C-4 and the second brake B-2. The rotation of the common carrier C0C1 coupled directly to the input shaft 14 is transferred to the third sun gear S2 of the multiple planetary gear set for shifting 16 via the fourth clutch C-4, and the third, fourth carriers C2C3 are fixed via the second brake B-2. Thus, the fourth ring gear R3 and further the output shaft 17 are rotated in a reverse direction by decelerating the rotation of the input shaft 14 with the gear ratio of the second reverse speed.

The third reverse speed (Rev3) is achieved by engagement of the third clutch C-3 and the second, third brakes B-2, B-3. The rotation of the input shaft 14 is transferred directly to the common carrier C0C1, and the first ring gear R0 is fixed via the third brake B-3, thereby rotating the second ring gear R1 at accelerated speed. The rotation of the second ring gear R1 is transferred to the third sun gear S2 of the multiple planetary gear set for shifting 16 via the third clutch C-3, and the third, fourth carriers C2C3 are fixed via the second brake B-2. Thus, the fourth ring gear R3 and further the output shaft 17 are rotated in a reverse direction by decelerating the rotation of the input shaft 14 with the gear ratio of the third reverse speed.

With the respective gear ratios $\lambda 1$, $\lambda 2$, $\lambda 3$, $\lambda 4$ (the number of teeth of the sun gear/the number of teeth of the ring gear) of the single pinion planetary gears 22, 26 and the double pinion planetary gears 23, 27 of the multiple planetary gear sets for acceleration/deceleration and for shifting 15, 16 being set to $\lambda 0=0.5$, $\lambda 1=0.45$, $\lambda 2=0.55$, $\lambda 3=0.375$ for example, calculation of the gear ratios of the respective shift speeds based on Equations (1), (2) results in that rotation ratios of the input shaft 14 to the output shaft 17 with the respective shift speeds, namely gear ratios, become appropriate values, 4.848 for the first speed, 2.336 for the second speed, 1.818 for the third speed, 1.539 for the fourth speed, 1.203 for the fifth speed, 1.000 for the sixth speed, 0.915 for the seventh speed, 0.829 for the eighth speed, 0.748 for the ninth speed, 0.676 for the tenth speed, 0.588 for the eleventh speed, 0.526 for the twelfth speed, 5.510 for the first reverse speed, 3.030 for the second reverse speed, 1.595 for the third reverse speed. Then, the steps between the respective gear ratios are 2.075 between the first, second speeds, 1.285 between the second, third speeds, 1.181 between the third, fourth speeds, 1.279 between the fourth, fifth speeds, 1.203 between the fifth, sixth speeds, 1.093 between the sixth, seventh speeds, 1.104 between the seventh, eighth speeds, 1.109 between the eighth, ninth speeds, 1.106 between the ninth, tenth speeds, 1.150 between the tenth, eleventh speeds, 1.117 between the eleventh, twelfth speeds, and the gear ratios decrease with appropriate ratios between the respective shift speeds. With the automatic transmission according to this embodiment, the gear ratios of twelve forward speeds and three reverse speeds which are separated appropriately can be obtained.

As described above, the gear ratios $\lambda 2$, $\lambda 3$ are set to appropriate values, such as $\lambda 2=0.55$, $\lambda 3=0.375$ for example, in the multiple planetary gear set for shifting 16 having the single pinion planetary gear 26 and the double pinion planetary gear 27, with the third carrier C2 supporting the pinion 24 of the single pinion planetary gear 26 and the fourth carrier C3 supporting the pinions 25, 25 of the double pinion planetary gear 27 meshing with each other being coupled directly, and with the third ring gear R2 of the single pinion planetary gear 26 and the fourth sun gear S3 of the double pinion planetary gear 27 being coupled directly. Therefore, the structure and the gear ratios of the multiple planetary gear set for shifting 16 together make it possible to appropriately separate respective intervals among the vertical line of the third sun gear S2, the vertical line of the third, fourth carriers C2C3 coupled to each other directly, the vertical line of the fourth ring gear R3, the vertical line of the third ring gear and the fourth sun gear R2S3 coupled to each other directly, on the speed diagrams. When the gear ratios $\lambda 2$, $\lambda 3$ are set to values in the vicinity of $\lambda 2=0.55$, $\lambda 3=0.375$ respectively, the intervals among the respective vertical lines can be made as appropriate intervals for realizing the twelve forward speeds and three reverse speeds, together with the above-described structure of the multiple planetary gear set for shifting 16.

Accordingly, the multiple planetary gear set for shifting 16 with the above-described structure is combined with the acceleration/deceleration output unit having the second element capable of rotating selectively at a decelerated number of rotations decelerating the rotation of the input shaft or at an accelerated number of rotations accelerating the rotation of the input shaft and the third element rotating at the same number of rotations as the input shaft, in which the second element and the third ring gear, and the fourth sun gear R2S3 are coupled selectively by the first clutch, the second element and the third sun gear S2 are coupled selectively by the third clutch C-3, the third element and the third sun gear S2 are coupled selectively by the fourth clutch C-4, the third sun gear S2 is fixed selectively by the first brake B-1, the third, fourth carriers C2C3 are fixed selectively by the second brake B-2, and the output shaft is coupled directly to the fourth ring gear R3. Therefore, the gear ratios of the twelve forward speeds and three reverse speeds which are separated by appropriate steps can be obtained using the setting of the number of teeth that can be used generally, and thereby it is possible to effectively use a range in the number of rotations of the engine that is desired to be used while obtaining good feeling in that shifting is performed.

Moreover, the acceleration/deceleration output unit is provided as the multiple planetary gear set for acceleration/deceleration 15 structured having the common carrier C0C1 supporting rotatably the long pinion 20 and the pinion 21 meshing with each other, the common sun gear S0S1 meshing with the long pinion 20, the first ring gear R0 meshing with the long pinion 20, and the second ring gear R1 meshing with the pinion 21 and is combined with the multiple planetary gear set for shifting 16 having the above-described structure, and the gear ratios $\lambda 0$, $\lambda 1$, $\lambda 2$, $\lambda 3$ are set to appropriate values such as $\lambda 0=0.5$, $\lambda 1=0.45$, $\lambda 2=0.55$, $\lambda 3=0.375$ for example. Therefore, the structure and the gear ratios of the multiple planetary gear sets for acceleration/deceleration and for shifting 15, 16 together make it possible to appropriately separate respective intervals among the vertical line of the common sun gear S0S1, the vertical line of the second ring gear R1, the vertical line of the common carrier C0C1, the vertical line of the first ring gear R0, as well as respective intervals among the vertical line of the third sun gear S2, the vertical line of the third, fourth carriers C2C3 coupled to each other directly, the vertical line of the fourth ring gear R3, and the vertical line of the third ring gear and the fourth sun gear R2S3 coupled to each other directly, on the speed diagrams. When the gear ratios $\lambda 0$, $\lambda 1$, $\lambda 2$, $\lambda 3$ are set to values in the vicinities of $\lambda 0=0.5$, $\lambda 1=0.45$, $\lambda 2=0.55$, $\lambda 3=0.375$ respectively, the intervals among the respective vertical lines can be made as appropriate intervals for realizing the twelve forward speeds and three reverse speeds, together with the above-described structure of the multiple planetary gear set for shifting 16.

Accordingly, the input shaft 14 is coupled directly to the common carrier C0C1, the common sun gear S0S1 is fixable via the fourth brake B-4, the first ring gear R0 is fixable via the third brake B-3, the second ring gear R1 and the third ring gear, and the fourth sun gear R2S3 are coupled selectively by the first clutch C-1, the second ring gear R1 and the third sun gear S2 are coupled selectively by the third clutch C-3, the common carrier C0C1 and the third sun gear S2 are coupled selectively by the fourth clutch C-4, the third sun gear S2 is fixed selectively by the first brake B-1, the third, fourth carriers C2C3 are coupled selectively to the input shaft 14 via the second clutch C-2 and also fixed selectively via the second brake B-2, and the output shaft 14 is coupled directly to the fourth ring gear R3. Thus, the gear ratios of the twelve forward speeds and three reverse speeds which are separated by appropriate steps can be obtained using the setting of the number of teeth that can be used generally. Further, the number of clutches is reduced to four, and the number of brakes, which have a simple structure and can be reduced in size, is set to four, and hence the automatic transmission, which has a simple structure and can be reduced in size and weight, can be obtained even though the number of shift speeds as large as twelve forward speeds and three reverse speeds.

The automatic transmission according to the present invention is suitable for use as an automatic transmission which shifts with a plurality of shift speeds rotation of an input shaft rotary driven by a motor of an automobile or the like by engaging/disengaging plural clutches and brakes and outputs the rotation to an output shaft.

According to exemplary aspects of the invention, even though the number of shift speeds are as large as twelve forward speeds and three reverse speeds, gear ratios of twelve forward speeds and three reverse speeds which are separated by appropriate steps can be obtained using a simply structured setting of the number of teeth that can be used generally, and thereby it is possible to effectively use a range in the number of rotations of an engine that is desired to be used while obtaining a good feeling in that shifting is performed. Further, when shifting between adjacent shift speeds, it is only required to switch one out of plural clutches and brakes from an engaged state to a disengaged state and another one from a disengaged state to an engaged state, and hence switching control becomes simple and shifting can be performed smoothly and reliably.

According to exemplary aspects of the invention, since an acceleration/deceleration output unit is a multiple planetary gear set for acceleration/deceleration, an automatic transmission having twelve forward speeds and three reverse speeds, which has a simple structure and can be reduced in size, can be provided.

According to exemplary aspects of the invention, the multiple planetary gear set for deceleration/acceleration is structured having a common carrier supporting rotatably a long pinion and a pinion which mesh with each other, a common sun gear meshing with the long pinion, a first ring gear meshing with the long pinion, and a second ring gear meshing with the pinion, the common sun gear is selectively fixed by a fourth brake, and the first ring gear is fixable selectively by a third brake. Accordingly, the automatic transmission having twelve forward speeds and three reverse speeds can be structured very compactly, and thereby can be reduced in weight and lowered in cost.

According to exemplary aspects of the invention, the multiple planetary gear set for shifting has a single pinion planetary gear and a double pinion planetary gear, a third carrier of the single pinion planetary gear and a fourth carrier of the double pinion planetary gear are coupled directly, and a third ring gear and a fourth sun gear are coupled directly. A third sun gear is coupled selectively to the second element of the deceleration output unit via the third clutch, coupled selectively to the third element via the fourth clutch, and fixed selectively via the first brake. The common carrier is coupled selectively to the input shaft via the second clutch, and fixed selectively via the second brake. A common ring gear is coupled directly to the output shaft. The third ring gear and the fourth sun gear coupled to each other directly are coupled selectively to the second element via the first clutch.

According to exemplary aspects of the invention, an automatic transmission having gear ratios of twelve forward speeds and three reverse speeds can be obtained, which is simple, small, and can be reduced in weight.

What is claimed is:

1. An automatic transmission, comprising:
    an input shaft;
    an acceleration/deceleration output unit that is coupled to the input shaft and has a first element that selectively outputs both a decelerated rotation and an accelerated rotation of the input shaft and a second element that outputs a same number of rotations as the input shaft;
    a multiple planetary gear set for shifting having third, fourth, fifth and sixth elements;
    a first clutch coupling the first element and the sixth element selectively;
    a second clutch coupling the input shaft and the fourth element selectively;
    a third clutch coupling the first element and the third element selectively;
    a fourth clutch coupling the second element and the third element selectively;
    a first brake fixing the third element selectively;
    a second brake fixing the fourth element selectively; and
    an output shaft coupled directly to the fifth element.

2. The automatic transmission according to claim 1, wherein the acceleration/deceleration output unit is a multiple planetary gear set for acceleration/deceleration.

3. The automatic transmission according to claim 2, wherein:
    the multiple planetary gear set for acceleration/deceleration is structured having a common carrier supporting rotatably a long pinion and a pinion that mesh with each other, a common sun gear meshing with the long pinion, a first ring gear meshing with the long pinion, and a second ring gear meshing with the pinion,
    the second ring gear is the first element,
    the common carrier is the second element and is coupled directly to the input shaft,
    the first ring gear is fixable via a third brake; and
    the common sun gear is fixable via a fourth brake.

4. The automatic transmission according to claim 1, wherein:
    the multiple planetary gear set for shifting has a single pinion planetary gear and a double pinion planetary gear,
    a carrier of the single pinion planetary gear and a carrier of the double pinion planetary gear are coupled directly to form the fourth element,
    a ring gear of the single pinion planetary gear and a sun gear of the double pinion planetary gear are coupled directly to form the sixth element,
    a sun gear of the single pinion planetary gear forms the third element, and
    a ring gear of the double pinion planetary gear forms the fifth element.

* * * * *